United States Patent [19]

Willis

[11] Patent Number: 4,802,000

[45] Date of Patent: Jan. 31, 1989

[54] VIDEO SWITCHING APPARATUS HAVING INTERFERENCE PREVENTION FEATURE

[75] Inventor: Donald H. Willis, Indianapolis, Ind.

[73] Assignee: RCA Licensing Corporation, Princeton, N.J.

[21] Appl. No.: 136,669

[22] Filed: Dec. 22, 1987

[51] Int. Cl.$^4$ .......................... H04N 9/78; H04N 9/64
[52] U.S. Cl. ................................... 358/21 R; 358/31; 358/181; 358/188
[58] Field of Search ................ 358/21 R, 31, 181, 188

[56] References Cited

U.S. PATENT DOCUMENTS

| | | | |
|---|---|---|---|
| 4,139,865 | 2/1979 | Iida et al. | 358/188 |
| 4,460,918 | 7/1984 | Flasza | 358/21 R |
| 4,660,073 | 4/1987 | Baumeister | 358/21 R |

FOREIGN PATENT DOCUMENTS 2134743 8/1984 United Kingdom ............. 358/21 R

OTHER PUBLICATIONS

U.S. Patent Application, Ser. No. 066,671 (McNeely et al) entitled "Adaptive Y/C Separation Apparatus for TV Signals".

Primary Examiner—John W. Shepperd
Attorney, Agent, or Firm—Eugene M. Whitacre; Paul J. Rasmussen; Eric P. Herrmann

[57] ABSTRACT

A Y/C selector switch is coupled to receive a first pair of internally-separated component signals $Y_1$, $C_1$ in addition to a second and a third pair of externally-supplied wideband component signals $Y_2$, $C_2$ and $Y_3$, $C_3$. The switch selects one of the pairs of input signals for application to its output terminals in response to a control signal. Means are provided for disabling the circuitry employed for generating the internally-separated component signals $Y_1$, $C_1$ when the Y/C switch is conditioned to apply a pair of externally-supplied component signals.

8 Claims, 2 Drawing Sheets

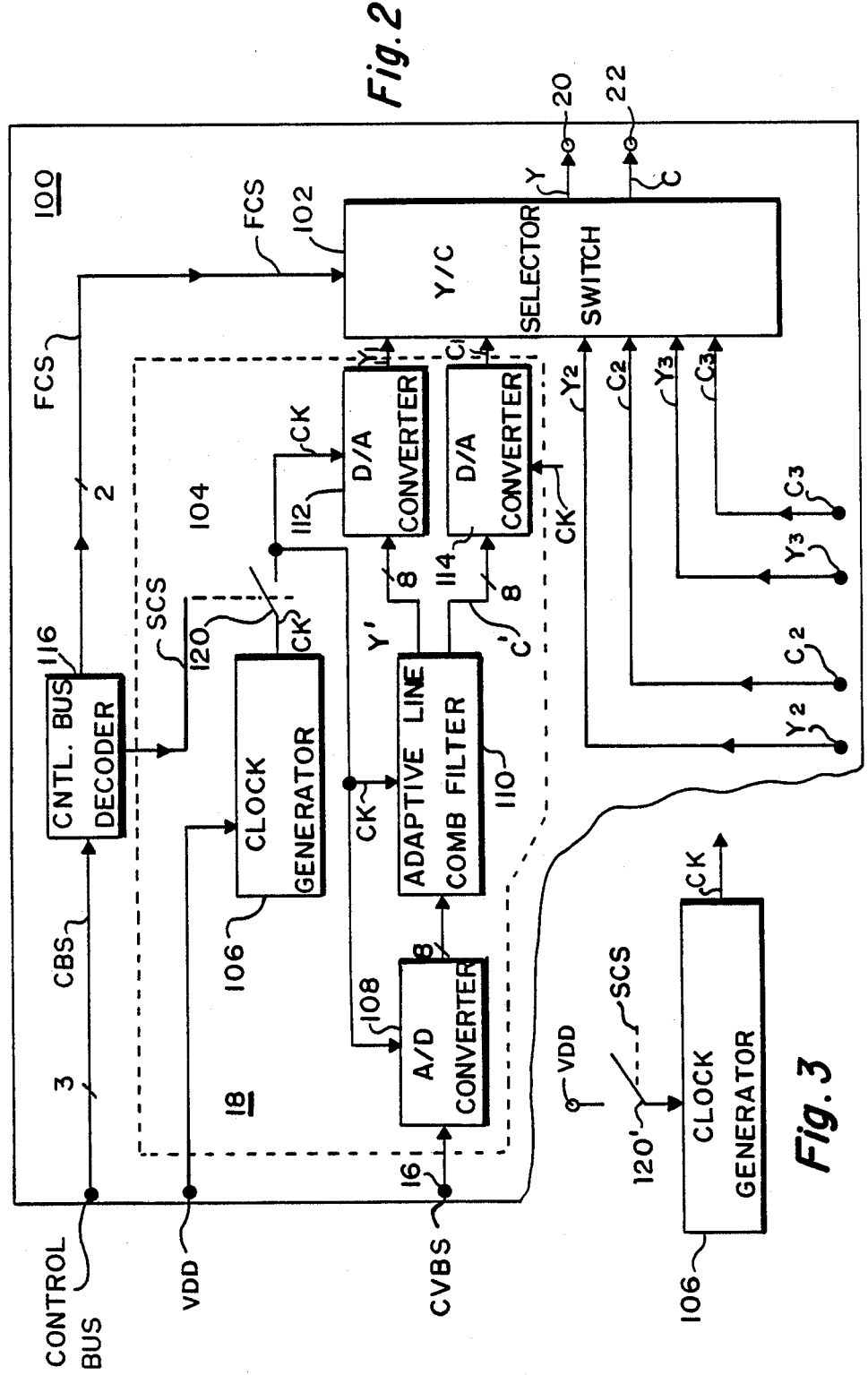

VIDEO SWITCHING APPARATUS HAVING INTERFERENCE PREVENTION FEATURE

This invention relates to an integrated switching circuit for use in a video signal processing system.

BACKGROUND

As shown in FIG. 1, a television (TV) receiver 10 is provided with an input terminal 12 for receiving a radio frequency (RF) signal from an antenna or a cable system. The RF signal is applied to a plurality of receiving circuits 14 including a tuner, intermediate frequency (IF) circuits and a video detector stage. A composite video baseband signal CVBS from the video detector stage is applied to a luma/chroma separator 18. The luma/chroma separator 18 separates the composite video signal CVBS into a luma component Y and a chroma component C. In the NTSC format, the bandwidth of the luma component recovered from a composite video baseband signal is about 4.2 MHz (or 330 lines of horizontal resolution).

A luma/chroma processor 24 translates the luma and chroma component signals Y and C into a set of red, green and blue picture tube drive signals R, G. and B. The R, G and B signals are amplified by an output stage 26 and applied to a picture tube 28.

A block 30, coupled to receive the composite video signal CVBS, includes the sync separator and deflection circuits. The circuits 30 develop a pair of horizontal and vertical deflection signals HDS and VDS. The horizontal and vertical deflection signals HDS and VDS are applied to a pair of deflection windings 32 disposed about the neck portion of the picture tube 28.

The kinescope 28, coupled to receive the red, green and blue drive signals R, G and B and responsive to the horizontal and vertical deflection signals HDS and VDS, produces color images on a screen 34.

Recently, higher definition TV systems (e.g., S-VHS and ED-BETA) have been introduced that provide already-separated luma and chroma, or Y/C signals. A feature of these new systems is that the luma signal has a considerably wider bandwidth (as compared to a 4.2 MHz bandwidth of a luma signal derived from an NTSC composite video baseband signal). Illustratively, the luma signal provided by the S-VHS system has a bandwidth of about 5.1 MHz (i.e., 400 lines of horizontal resolution). The luma signal provided by the ED-BETA system, on the other hand, has a bandwidth of about 6.4 MHz (i.e., 500 lines of resolution).

Typically, a standard color TV receiver is not equipped to handle these externally-supplied wideband luma and chroma signals. It is possible to combine these externally-supplied wideband Y/C signals into a composite video baseband signal in the NTSC format, and apply it to the luma/chroma separator 18. Because the luma/chroma separation process is inevitably imperfect in practice, there is always some possibility of cross contamination. The presence of the luma signal in the chroma channel is known as cross-color. The presence of the chroma signal in the luma channel manifests itself as hanging or crawling dots on the TV screen.

In accordance with this invention, a video selector or Y/C switch is provided which has input terminals for receiving the internally-separated luma and chroma signals $Y_1$ and $C_1$, as well as the 6 externally-supplied wideband luma and chroma signals $Y_2$, $C_2$ and $Y_3$, $C_3$. The video switch selects a pair of input component signals for application to its output terminals in response to a control signal FCS.

Pursuant to a further feature of this invention, means are provided for disabling the luma/chroma separator circuits when the video selector switch selects a pair of externally-supplied component signals for application to its output terminals.

IN THE DRAWINGS

FIG. 1 provides a block diagram of a conventional TV receiver to illustrate the environment in which the subject invention is used;

FIG. 2 is a block diagram of an integrated circuit that incorporates the Y/C selector switch and the disabling means in accordance with the principles of the present invention; and FIG. 3 is an alternative arrangement of the FIG. 2 disabling means.

DETAILED DESCRIPTION

Figure 1:
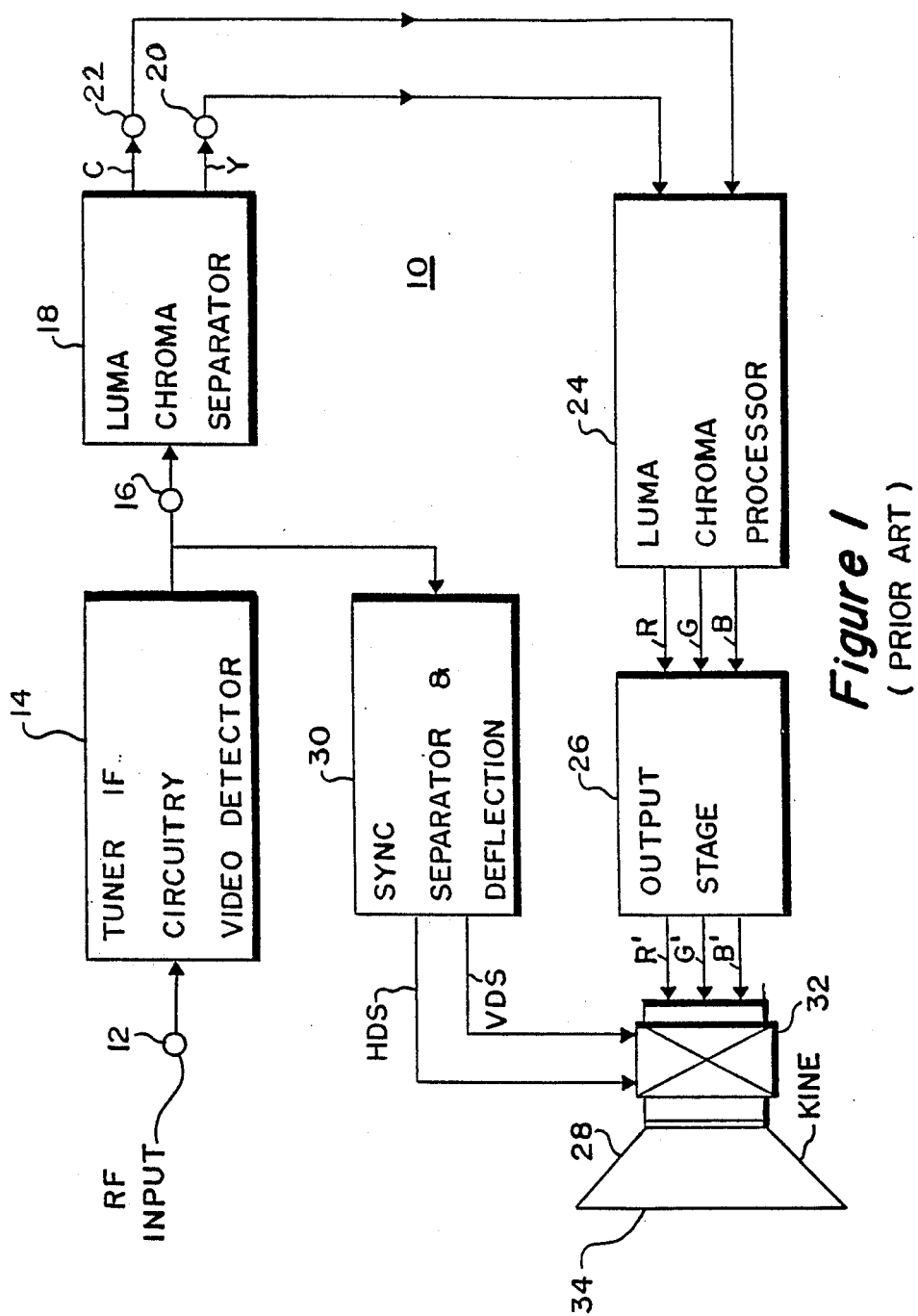

In the drawings, the lines interconnecting various blocks represent either single conductor connections carrying analog signals or buses carrying binary digital signals, as the case may be. A value next to a slash mark intercepting a particular interconnecting line represents the number of parallel connections of that line or bus.

Depending on the processing speed of the devices used, compensating delays may be required in certain of the signal paths. One skilled in the art of digital video signal processing circuit design would know where such delays would be needed in a particular system.

Shown in FIG. 2 is an integrated circuit 100, which houses a Y/C selector switch 102 and disabling means 104 in addition to the FIG. 1 luma/chroma separator 18. For the purposes of description, the luma/chroma separator 18 is assumed to include a digital comb filter. Alternatively, the luma/chroma separator 18 could be a charge coupled device (CCD) comb filter.

The digital comb filter 18 includes a circuit 106 for generating a burst-locked system clock signal CK. The frequency $F_{CK}$ of the clock signal CK is established at 4 times the frequency $F_{SC}$ of the color subcarrier signal component (i.e., color burst) of the composite video signal CVBS. Additionally, the clock signal CK is phase locked to the color burst signal.

An analog-to-digital (A/D) converter 108 translates the composite video signal CVBS into 8-bit binary digital samples at instants determined by the clock signal CK. The digital samples from the A/D converter 108 are applied to a digital comb filter 110. The filter 110 separates the incoming stream of digital samples into samples representative of the luma component $Y'_1$ and samples representative of the chroma component $C'_1$.

A pair of digital-to-analog converters 112 and 114 convert the digital luma and chroma samples $Y'_1$ and $C'_1$ into corresponding analog representations $Y_1$ and $C_1$ thereof. The digital comb filter circuits 106–114 are of the type described in greater detail in a commonly-assigned, copending U.S. patent application, Ser. No. 066,671, of McNeely et al. and entitled "ADAPTIVE Y/C SEPARATION APPARATUS FOR TV SIGNALS". The above McNeely et al. application is herein incorporated by reference.

The analog luma and chroma component signals $Y_1$ and $C_1$ are applied to a first pair of input terminals of the video selector switch 102. The switch 102 is further equipped with second and third pairs of input terminals for receiving externally-supplied wideband component signals $Y_2$, $C_2$ and $Y_3$, $C_3$.

The component signals $Y_2$, $C_2$ and $Y_3$, $C_3$ are of the type supplied by an SVHS video cassette recorder. As previously indicated, externally-supplied luma signal components $Y_2$ and $Y_3$ may be wideband signals, with bandwidths that may extend well beyond the bandwidth of the internally-generated luma signal component $Y_1$.

The video switch 102, responsive to a 2-bit first control signal FCS, selects one of the three sets of input component signals $Y_1/C_1$, $Y_2/C_2$ and $Y_3/C_3$ for application to a pair of output terminals 20 and 22. The luma and chroma signals Y and C from the output terminals 20 and 22 of the video switch 102 are applied to the luma/chroma processor 24.

The IC 100 is equipped with a control bus decoder 116, which provides the first control signal FCS in response to a three-wire user-controlled serial-bus signal CBS. The Y/C selector switch 102 responds to the control signal FCS. Illustratively, the switch 102 selects the first, second and third pairs of component signals $Y_1/C_1$, $Y_2/C_2$ and $Y_3/C_3$ when the first control signal is 01, 10 and 11 respectively. The Y/C selector switch 102 sends no output to the output terminals 20 and 22 when the first control signal FCS is 00.

The control bus decoder 116 additionally provides a second control signal SCS for disabling the circuitry 18 used for decoding the composite video signal CVBS into its components when the selector switch 102 selects a pair of externally-supplied component signals for application to the luma/chroma processor 24. To this end, an electronic gate switch 120 is interposed between the clock generator 106 and the rest of the digital processing circuitry 18. When the switch 120 is opened, the A/D converter 108, the comb filter 110 and the D/A converters 112 and 114 are shut off or deactivated.

FIG. 3 shows an alternative arrangement for disabling the composite signal decoding circuitry 18. As shown therein, a switch 120', responsive to the control signal SCS, is interposed between a DC operating voltage VDD and the clock generator 106. When the switch 120' is opened, it turns off the clock generator 106. When the clock is turned off, all the clock-driven circuits 108–114 are also shut off.

An advantage of this invention is that it prevents the interference from the clocked circuits 18 from coupling into the externally-supplied wideband component signals $Y_2$ and $Y_3$, when the Y/C selector switch 102 selects a pair of externally-supplied component signals for application to its output terminals 20 and 22 As previously indicated, the bandwidth of these externally-supplied component signals is sufficiently wide (e.g., 6.4 MHz) to make them susceptible to cross-talk from the clock-driven circuits 18.

In the embodiment described and shown herein, a digital comb filter 18 is used for separating a composite video signal CVBS into its luma and chroma components $Y_1$ and $C_1$. The composite video signal CVBS is sampled at instants determined by the clock signal CK and quantized into 8-bit binary digital samples. However, the present invention is not limited to digital signal processing. As indicated before, it is equally applicable to a composite signal decoding system using a CCD comb filter. In a CCD comb filter, a composite video signal CVBS is sampled in response to a clock signal, but is not quantized into binary digital values.

Furthermore, in the embodiment shown and described, the Y/C selector switch 102 is coupled to receive the analog component signals $Y_1/C_1$, $Y_2/C_2$ and $Y_3/C_3$. Alternatively, the Y/C selector switch 102 could be designed to receive digital component signals.

What is claimed is:

1. An integrated circuit apparatus comprising:
   a first input terminal coupled to receive a first video signal FVS;
   a source of a clock signal CK;
   sampled signal processing means coupled to receive said first video signal FVS and responsive to said clock signal CK for generating a processed first video signal FVS';
   a second input terminal coupled to receive a second video signal SVS; the bandwidth of said second video signal being sufficiently broad to create the possibility of interference from said processed first video signal FVS' coupling into said second video signal SVS;
   switching means coupled to receive said processed first video signal FVS' and said second video signal SVS and responsive to a first control signal FCS for applying one of said two input signals to an output terminal thereof; and
   means for disabling said sampled signal processing means when said switching means selects a signal other than said processed first video signal FVS' for application to said output terminal.

2. Apparatus defined in claim 1 wherein said disabling means comprises means interposed between said clock signal source and said digital signal processing means and responsive to a second control signal SCS for preventing said clock signal CK from being applied to said sampled signal processing means.

3. Apparatus defined in claim 1 wherein said first video signal FVS is a composite video signal; wherein said sampled signal processing means separates said composite first video signal FVS into a component signal for application to said switching means.

4. Apparatus defined in claim 3 wherein said composite first video signal FVS is an analog signal; wherein said sampled signal processing means includes an analog-to-digital (A/D) converter responsive to said clock signal CK for generating a stream of digital samples representative of said analog composite first video signal FVS; wherein said sampled signal processing means further includes a digital filter coupled to receive said digital samples and responsive to said clock signal CK for generating digital samples representative of said component signal for application to said switching means.

5. Apparatus defined in claim 4 wherein said second video signal SVS is an externally-supplied analog component signal; wherein said sampled signal processing means additionally includes a digital-to-analog (D/A) converter coupled to receive said digital samples representative of said internally-generated component signal and responsive to said clock signal CK for generating an analog version of said internally-generated component signal; wherein said switching means is coupled to receive the analog representations of said internally-generated component signal and said externally-supplied component signal; wherein said switching means responsive to said first control signal FCS applies one of said component signals to said output terminal thereof.

6. Apparatus defined in claim 5 wherein said second video signal SVS comprises a luma signal component $Y_2$ and a chroma signal component $C_2$; wherein said digital filter separates said first video signal FVS into a digital luma signal component $Y'_1$ and a digital chroma signal component $C'_1$; wherein said apparatus includes a pair of D/A converters coupled to receive the respective component signals $Y'_1$ and $C'_1$ and responsive to said clock signal CK for generating the analog versions $Y_1$ and $C_1$ thereof; wherein said switching means is coupled to receive the first and second pairs of component signals $Y_1$, $C_1$ and $Y_2$, $C_2$; wherein said switching means responsive to said first control signal FCS applies a selected pair of component signals to a pair of output terminals thereof.

7. Apparatus defined in claim 1 wherein said disabling means comprises means interposed between a source of DC operating voltage and said clock signal source and responsive to said second control signal SCS for disabling said clock signal source and said sampled signal processing means.

8. A circuit apparatus comprising:

a first input terminal coupled to receive a first video signal FVS;

a source of a clock signal CK;

sampled signal processing means coupled to receive said first video signal FVS and responsive to said clock signal CK for generating a processed first video signal FVS';

a second input terminal coupled to receive a second video signal SVS; the bandwidth of said second video signal being sufficiently broad to create the possibility of interference from said processed first video signal FVS' coupling into said second video signal SVS;

switching means coupled to receive said processed first video signal FVS' and said second video signal SVS and responsive to a first control signal FCS for applying one of said two input signals to an output terminal thereof; and means for disabling said sampled signal processing means when said switching means selects a signal other than said processed first video signal FVS' for application to said output terminal.

* * * * *